Aug. 26, 1924.
J. P. MURPHY
1,506,599
METHOD OF WRAPPING BEEF
Filed April 19, 1924
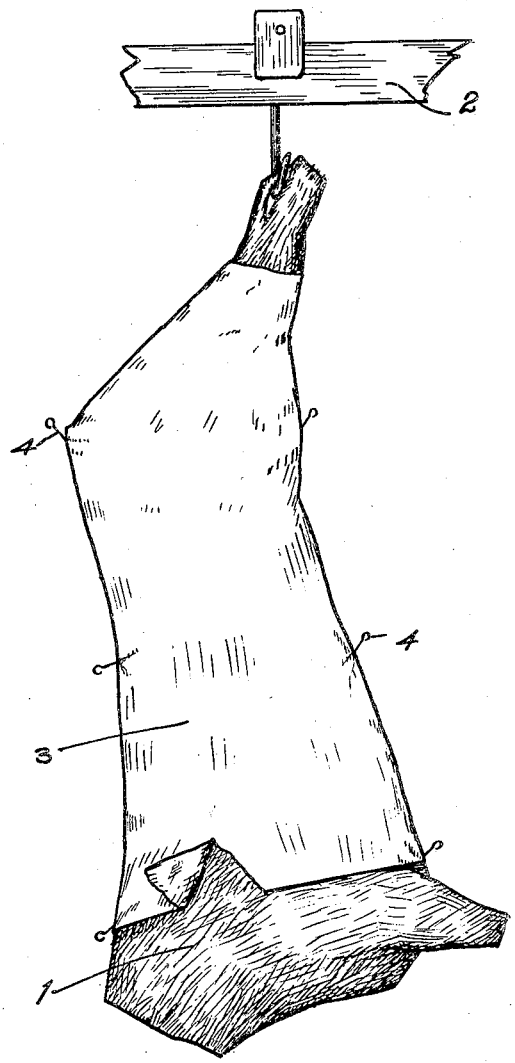
Inventor
Joseph Paul Murphy.
By A. J. O'Brien
Attorney Patented Aug. 26, 1924.

1,506,599

UNITED STATES PATENT OFFICE.

JOSEPH PAUL MURPHY, OF DENVER, COLORADO, ASSIGNOR TO BLAYNEY-MURPHY COMPANY, OF DENVER, COLORADO, A CORPORATION OF COLORADO.

METHOD OF WRAPPING BEEF.

Application filed April 19, 1924. Serial No. 707,627.

*To all whom it may concern:*

Be it known that I, JOSEPH PAUL MURPHY, a citizen of the United States, residing at Denver, in the city and county of Denver and State of Colorado, have invented certain new and useful Improvements in Methods of Wrapping Beef; and I do declare the following to be a full, clear, and exact description of the invention, such as will enable others skilled in the art to which it appertains to make and use the same, reference being had to the accompanying drawings, and to the characters of reference marked hereon, which form a part of this specification.

This invention relates to a method of wrapping beef carcasses so as to improve their appearance.

In slaughter houses and packing plants, where a large number of beef cattle are killed and dressed for market, the dressed carcass is suspended from a track by means of hooks and rollers. It is then split into two substantially equal parts, after which it is conveyed to a cooling chamber, where it is kept until the animal heat has left. It is then transferred to a cold storage chamber.

It has been found that the layer of fat which is found directly beneath the skin of the animal and which is exposed to view after the hide has been removed, hardens into a rough, irregular surface when the carcass cools. This rough surface, although it does not in any way affect the quality of the meat, detracts somewhat from its appearance and is therefore objectionable.

It is the object of this invention to produce a simple method of treatment whereby the surface of the beef carcass, when it cools, will be smooth so as to present a more pleasing appearance. It is a further object to cause the surface of the beef to become slightly bleached during the cooling operation, which further adds to its appearance.

My invention is very simple and is carried out as follows:—After the beef carcass has been dressed, hung on the trolley and while it is still warm, it is covered with strong undyed muslin, which has been soaked in a warm salt brine. The muslin is stretched as tightly as possible over the outside of the carcass and attached thereto by steel pins. After the brine-soaked muslin has been attached, the carcass is transferred to the cooling room. After a lapse of about twenty-four hours, when the carcass is cold, the muslin is removed. The outer surface of the carcass will now be found to be smoother and several shades whiter than if it had not been treated in the manner described. The smoothing effect is caused by the muslin which holds the soft fat while it is hardened by cooling, and also produces a bleaching effect which may be enhanced by the action of the salt.

In order to make my invention clearer, I have attached hereto a drawing in which the single figure shows one-half of a beef carcass 1 suspended from a track 2. The greater portion of the carcass has a muslin cover 3 stretched tightly over its outer surface. This muslin cover is held in place by pins 4.

The muslin covers may be used several times. After each time they are carefully washed and are then immersed in brine and applied to the carcass while wet.

It should be explained that this method may be applied to carcasses other than beef and with the same advantage.

Having now described my invention, what I claim as new is:

1. The method of treating beef carcasses, which consists in applying to the outside of the carcass while it is still warm, a covering of cloth which is stretched tight and held in place until the carcass cools.

2. The method of treating beef carcasses, which consists in applying to the outside of the carcass while it is still warm, a covering of cloth which is saturated with salt brine, stretched tight and fastened at its edges to the carcass, said cloth being held in place until the carcass cools.

3. The herein-described method of treating of carcasses, which consists in applying to the outside thereof and while still warm, a thin covering of cloth, which is held in place until the carcass cools.

4. The herein-described method of treating carcasses, which consists in applying to the outside thereof while still warm, a thin covering of cloth saturated with salt brine, the said covering being held in place until the carcass cools.

In testimony whereof I affix my signature.

JOSEPH PAUL MURPHY.